United States Patent

[11] 3,568,697

| [72] | Inventor | Angelo G. Tasca |
| --- | --- | --- |
| | | Woodland Hills, Calif. |
| [21] | Appl. No. | 810,186 |
| [22] | Filed | Mar. 25, 1969 |
| [45] | Patented | Mar. 9, 1971 |
| [73] | Assignee | The United States of America, as represented by the Secretary of the Army |

[54] ANTI-PROPULSION DEVICE
5 Claims, 2 Drawing Figs.

[52] U.S. Cl............................................. 137/68, 220/89, 251/100
[51] Int. Cl..................................................... F16k 13/04
[50] Field of Search........................................... 137/68, 69; 220/89 (A); 251/100

[56] References Cited
UNITED STATES PATENTS
763,263  6/1904  Cooke.......................... 251/100

1,863,455  6/1932  Rowley.......................... 137/69
2,637,333  5/1953  Houston........................ 137/68

*Primary Examiner*—William F. O'Dea
*Assistant Examiner*—Richard Gerard
*Attorneys*—Edward J. Kelly, Herbert Berl, Charles R. Carter and Harry M. Saragovitz ABSTRACT: An anti-propulsion or safety device to prevent the inadvertent firing of a missile by supporting an oxidizer burst diaphragm to keep it from bursting if a propellant gas generator is accidentally ignited. The device includes a beam to support the burst diaphragm located at the end of the propellant gas generator, a rod secured to the beam, a keyhole stop for sliding engagement with the rod, torque producing means in the stop encircling the rod and an operating handle secured to the rod.

PATENTED MAR 9 1971

3,568,697

ANGELO G. TASCA,
INVENTOR,

BY Harry M. Saragovitz
Edward J. Kelly
Herbert Berl  Attorneys
Charles R. Carter
AGENT

ANTI-PROPULSION DEVICE

BACKGROUND OF THE INVENTION

This invention relates to the field of missile firing safety devices. After propellant gas generators have ignited they generate gas pressure that builds up to a predetermined level and bursts a diaphragm thereby allowing the gas to flow to the next stage. However, a problem exists when the propellant gas generator is inadvertently ignited and bursts the diaphragm.

SUMMARY OF THE INVENTION

The present invention provides a solution to this problem by providing a beam supporting the burst diaphragm and thus preventing it from bursting. In the "safe position" the beam backs up the diaphragm and in the "armed" position the beam is withdrawn allowing the diaphragm to burst when the pressure builds up to a predetermined point.

This invention may be better understood from the following detailed description taken in conjunction with the accompanying drawings:

DESCRIPTION OF THE PREFERRED EMBODIMENT

Figure 3:
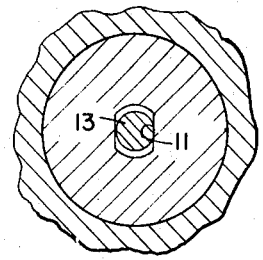
FIG. 3 is taken along line 3—3 of FIG. 2 showing the rod and keyhole relationship.

Reference numeral 1 indicates the housing of the gas generator end wall. Reference numeral 2 indicates a fluid flow path including an inlet side and an outlet side through housing 1. Diaphragm 3 is contiguous with the housing and closes off the fluid flow path. Beam 4 is shown, in FIG. 1, mounted in the flow path and supporting diaphragm 3. Chamber 5 houses beam holding end 6 and acts as a piston in the chamber. O-rings 7 seal beam end 6 from any back flow of fluid through the chamber. Actuating rod 8 has a beam engaging end 9 held in engagement with beam end 6 by retainer 10. Rod 8 is designed in a keylike shape for sliding engagement with keyhole 11 in stop 12. Keyhole 11 is more clearly shown in FIG. 3 and has a pair of opposite rounded sides mating with a pair of opposite straight sides. The main part of rod 8 is shaped similar to the shape of the keyhole but slightly smaller to allow passage of the rod through the keyhole. Two sections 13, 14 of rod 8 are circular, one of which is shown in FIG. 3, to hold the rod in either its raised or lowered position. Gland 15, made of nylon, and threaded adjusting nut 16 are located within a cavity of stop 12 and surround the rod. Operating handle 17 is secured to the actuating rod by pin 18. The twisting torque applied to the rod is produced by adjusting nut 16 acting through member 19 to increase or decrease the compressional load on gland 15. When the beam is withdrawn, the air in the chamber above beam end 6 will vent through the slightly larger keyhole opening 11 or another vent may be provided if desired.

Figure 1:
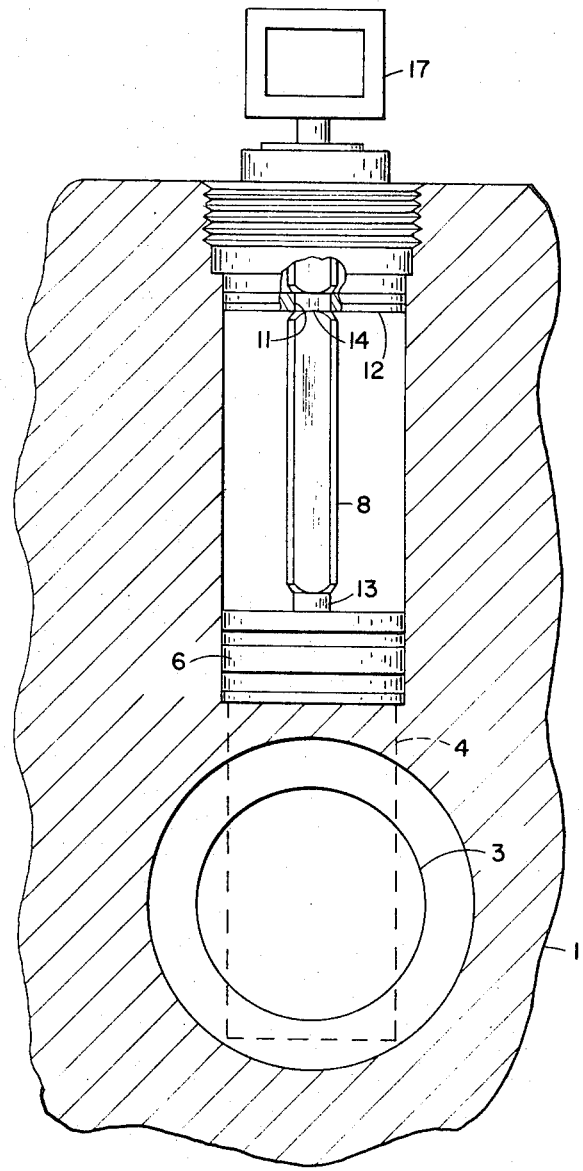
FIG. 1 is a view partially in section showing the device in the safe or supporting position.
Figure 2:
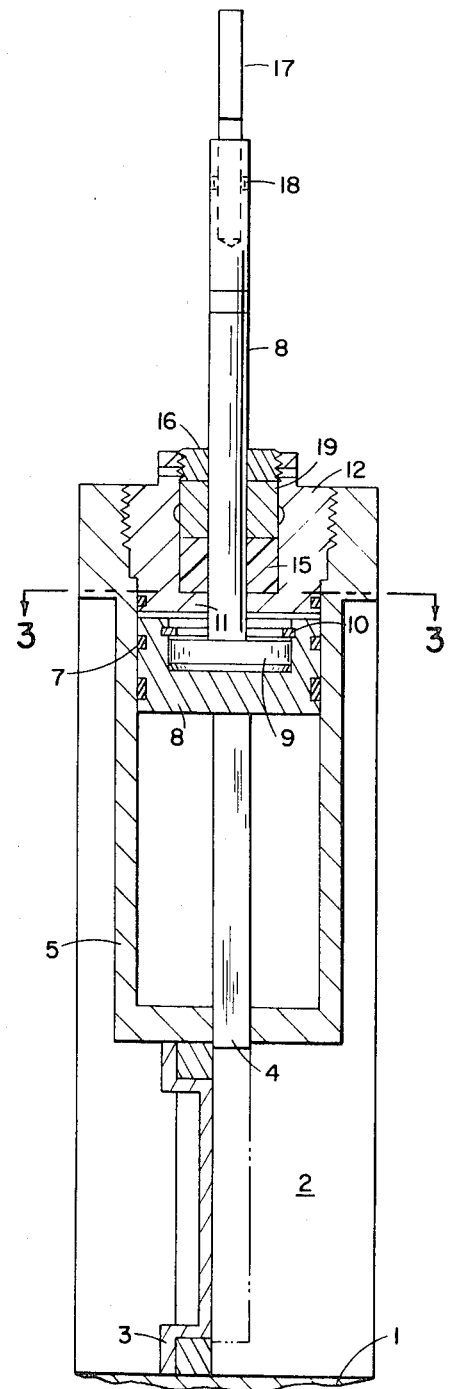
FIG. 2 is a sectional view revolved 90° from FIG. 1 showing the device in the armed or withdrawn position.

The device is operated by hand and actuation moves it from a position termed "safe" to a position termed "armed." FIG. 1 shows the "safe" position where section 14 is in the keyhole and the opposite rounded sides of rod 8 are resting on the opposite straight sides of the keyhole. After the handle has been turned approximately 90° corresponding opposite sides of the rod and keyhole will be aligned and the beam can be withdrawn to an "armed" position, shown in FIG. 2. In the armed position section 13 of the rod will be in the keyhole and the handle is given another 90° turn so that opposite rounded sides or rod 8 will rest on the opposite straight sides of the keyhole. Repetition of the steps in reverse order puts the device back into the "safe" position.

I claim:

1. An antipropulsion device to prevent the inadvertent firing of a missile comprising: a fluid flow path having an inlet and an outlet through the housing; a diaphragm contiguous with the housing and closing off said fluid flow path; a diaphragm supporting beam slidably mounted in said housing and supporting said diaphragm against inlet pressure when in a safe position; an actuating rod secured to said beam; a stop having a keyhole disposed in sliding engagement with said rod; said rod having means cooperating with said keyhole in certain rotary positions of said rod for retaining said rod in selective diaphragm supporting positions; torque producing means within said stop encircling said rod for applying a torque to said rod to bias said rod into said rotary positions; and a handle secured to said rod for actuating said rod in a linear direction and a rotary direction.

2. A device as set forth in claim 1 wherein said device includes a chamber and a piston located in said chamber.

3. A device as set forth in claim 2 wherein said rod means cooperating with said keyhole comprises; a pair of opposite rounded sides mating with a pair of opposite straight sides.

4. A device as set forth in claim 3 wherein said keyhole is made with a pair of opposite rounded sides mating with a pair of opposite straight sides.

5. A device as set forth in claim 4 wherein said torque producing means includes a nylon gland and an adjusting nut.